United States Patent
Kojima et al.

(10) Patent No.: US 9,419,506 B2
(45) Date of Patent: Aug. 16, 2016

(54) DIRECT CURRENT MOTOR, COIL WINDING METHOD FOR DIRECT-CURRENT MOTOR, AND METHOD FOR MANUFACTURING DIRECT-CURRENT MOTOR

(71) Applicant: ASMO CO., LTD., Shizuoka-ken (JP)

(72) Inventors: Hiroshi Kojima, Kosai (JP); Keita Kawai, Toyohashi (JP); Takayoshi Suzuki, Toyohashi (JP); Toshiaki Yamada, Hamamatsu (JP)

(73) Assignee: ASMO CO., LTD. (JP)

( * ) Notice: Subject to any disclaimer, the term of this patent is extended or adjusted under 35 U.S.C. 154(b) by 499 days.

(21) Appl. No.: 13/663,054

(22) Filed: Oct. 29, 2012

(65) Prior Publication Data

US 2013/0193795 A1 Aug. 1, 2013

(30) Foreign Application Priority Data

Oct. 31, 2011 (JP) .................................. 2011-239524

(51) Int. Cl.
*H02K 23/26* (2006.01)
*H02K 15/095* (2006.01)
*H02K 23/36* (2006.01)

(52) U.S. Cl.
CPC .............. *H02K 23/26* (2013.01); *H02K 15/095* (2013.01); *H02K 23/36* (2013.01); *Y10T 29/49011* (2015.01)

(58) Field of Classification Search
CPC ...... H02K 15/095; H02K 23/36; H02K 23/26
See application file for complete search history.

(56) References Cited

U.S. PATENT DOCUMENTS

| 2005/0275301 A1* | 12/2005 | Moriya et al. ........... 310/156.45 |
| 2009/0058210 A1* | 3/2009 | Qin et al. ........................ 310/179 |
| 2011/0127871 A1 | 6/2011 | Roos | |

FOREIGN PATENT DOCUMENTS

| CN | 101378214 | 3/2009 |
| JP | 2008-113485 | 5/2008 |
| JP | 2009-027829 | 2/2009 |
| JP | 2009-303390 | 12/2009 |

(Continued)

OTHER PUBLICATIONS

Official Action for Japan Patent Application No. 2011-239524, dated Jul. 28, 2015, 4 pages.

(Continued)

*Primary Examiner* — Dang Le
(74) *Attorney, Agent, or Firm* — Sheridan Ross P.C.

(57) ABSTRACT

A direct-current motor includes a yoke having six magnetic poles, an iron core having nine teeth, first and second coils wound about each tooth in directions different from each other, a commutator for being rotated integrally with the iron core and having eighteen commutator pieces, and three pairs of brushes. The brush having the positive pole electrically connected to the first coil is different from the brush having the positive pole electrically connected to the second coil, the brush having the negative pole electrically connected to the first coil is different from the brush having the negative pole electrically connected to the second coil, or the brush having the positive pole and the brush having the negative pole that are electrically connected to the first coil are respectively different from the brush having the positive pole and the brush having the negative pole that are electrically connected to the second coil.

6 Claims, 5 Drawing Sheets

(56) References Cited

FOREIGN PATENT DOCUMENTS

| | | |
|---|---|---|
| JP | 2011-41389 | 2/2011 |
| JP | 2011-512782 | 4/2011 |

OTHER PUBLICATIONS

Official Action with Machine Translation for China Patent Application No. 201210440806.3, dated Dec. 11, 2015, 13 pages.

* cited by examiner

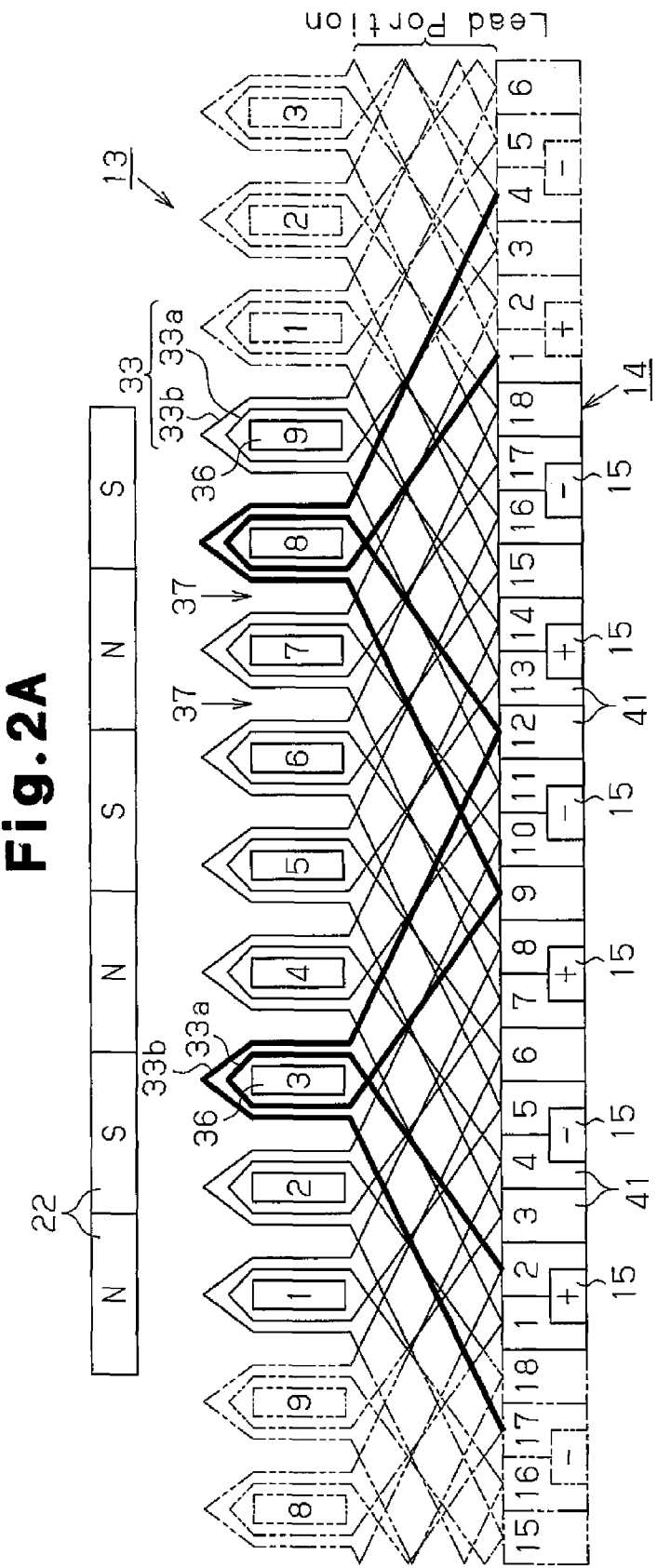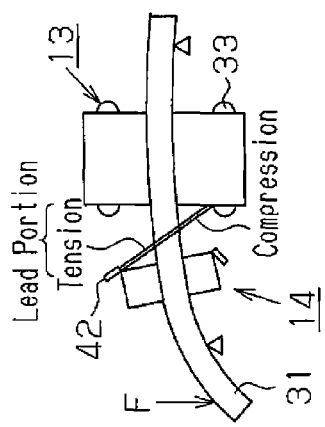
Fig.2A
Fig.2B

US 9,419,506 B2

DIRECT CURRENT MOTOR, COIL WINDING METHOD FOR DIRECT-CURRENT MOTOR, AND METHOD FOR MANUFACTURING DIRECT-CURRENT MOTOR

BACKGROUND OF THE INVENTION

The present invention relates to a brushed direct-current motor and a coil winding method for the direct-current motor, and a method for manufacturing the direct-current motor.

A conventional brushed direct-current motor is disclosed in, for example, Japanese Laid-Open Patent Publication No. 2009-27829. The direct-current motor includes a cylindrical yoke having six magnetic poles, an armature rotationally provided inside the yoke, and a commutator, which rotates integrally with the armature. An iron core of the armature includes nine teeth. Each tooth has two coils, which are wound in different winding directions. The commutator includes eighteen commutator pieces, which are arranged in a rotation direction. The winding start end and the winding finish end of the corresponding coil are hooked around each commutator piece. Also, the commutator pieces having the same potential are short-circuited by an equalizer. Two brushes slide against the commutator pieces. Magnetic field is generated on the coils by supplying electricity to the coils via the brushes. The armature is rotated by magnetic attraction and repulsion caused between the magnetic field of the coils and the magnetic poles of the yoke.

In general, the direct-current motor including the direct-current motor of the above publication may be desired to have higher output. In this case, current supplied to the direct-current motor may be increased. However, when current is increased in the direct-current motor of the above publication, decrease in the life of the brushes becomes a concern. That is, since the current loaded on each brush is increased, electrical wear caused by commutation sparks might be undesirably promoted. Also, the greater the amount of supplied current becomes, the greater the diameter of the equalizer needs to be set. Therefore, the space for arranging the equalizer is not easily ensured. As described above, there is a room for improvement in the direct-current motor of the above publication in the aspect of increasing the output.

SUMMARY OF THE INVENTION

Accordingly, it is an objective of the present invention to provide a direct-current motor that is capable of increasing output while employing a structure in which the number of slots is half the number of commutator pieces, a coil winding method for the direct-current motor, and a method for manufacturing the direct-current motor.

To achieve the foregoing objective and in accordance with a first aspect of the present invention, a direct-current motor is provided that includes a cylindrical yoke having six magnetic poles, an iron core, a first coil, a second coil, a commutator, and three sets of brushes retained inside the yoke. The iron core is rotationally provided inside the yoke and has nine teeth arranged in a rotation direction. The first coil is wound about each tooth in a forward direction. The second coil is wound about each tooth in a reverse direction with respect to the first coil. The commutator is rotated integrally with the iron core and has eighteen commutator pieces arranged in the rotation direction. Each set of the brushes set has a pair of brushes and supplies electricity to the first and second coils by sliding against the corresponding commutator pieces. The first and second coils provided on the same tooth are connected to the commutator pieces of the same phase such that the first and second coils are electrically connected to an arbitrary one of the brushes having a positive pole and an arbitrary one of the brushes having a negative pole simultaneously. The brush having the positive pole electrically connected to the first coil is different from the brush having the positive pole electrically connected to the second coil, or the brush having the negative pole electrically connected to the first coil is different from the brush having the negative pole electrically connected to the second coil, or the brush having the positive pole and the brush having the negative pole that are electrically connected to the first coil are respectively different from the brush having the positive pole and the brush having the negative pole that are electrically connected to the second coil.

A second aspect of the present invention provides a coil winding method for the direct-current motor according to the first aspect, in which each of the first and second coils is continuously wound.

In accordance with a third aspect of the present invention, a method for manufacturing a direct-current motor is provided. The method includes: providing a cylindrical yoke having six magnetic poles; providing an iron core rotationally provided inside the yoke, the iron core having nine teeth arranged in a rotation direction; providing a first coil wound about each tooth in a forward direction; providing a second coil wound about each tooth in a reverse direction with respect to the first coil; providing a commutator for being rotated integrally with the iron core, the commutator having eighteen commutator pieces arranged in the rotation direction; and providing three sets of brushes retained inside the yoke, each set having a pair of brushes, wherein each set of the brushes supplies electricity to the first and second coils by sliding against the corresponding commutator pieces. The first and second coils provided on the same tooth are connected to the commutator pieces of the same phase such that the first and second coils are electrically connected to an arbitrary one of the brushes having a positive pole and an arbitrary one of the brushes having a negative pole simultaneously. The brush having the positive pole electrically connected to the first coil is different from the brush having the positive pole electrically connected to the second coil, or the brush having the negative pole electrically connected to the first coil is different from the brush having the negative pole electrically connected to the second coil, or the brush having the positive pole and the brush having the negative pole that are electrically connected to the first coil are respectively different from the brush having the positive pole and the brush having the negative pole that are electrically connected to the second coil.

BRIEF DESCRIPTION OF THE DRAWINGS

FIG. 2A is a developed view illustrating an armature of the direct-current motor of the first embodiment;

FIG. 2B is a schematic front view illustrating the coil lead portion in a state in which external force in a bending direction is applied to the rotary shaft;

DETAILED DESCRIPTION OF THE PREFERRED EMBODIMENTS

First Embodiment

A direct-current motor according to a first embodiment of the present invention will now be described with reference to FIGS. 1, 2A, and 2B.

<Schematic Structure of Direct-Current Motor>

Figure 1:
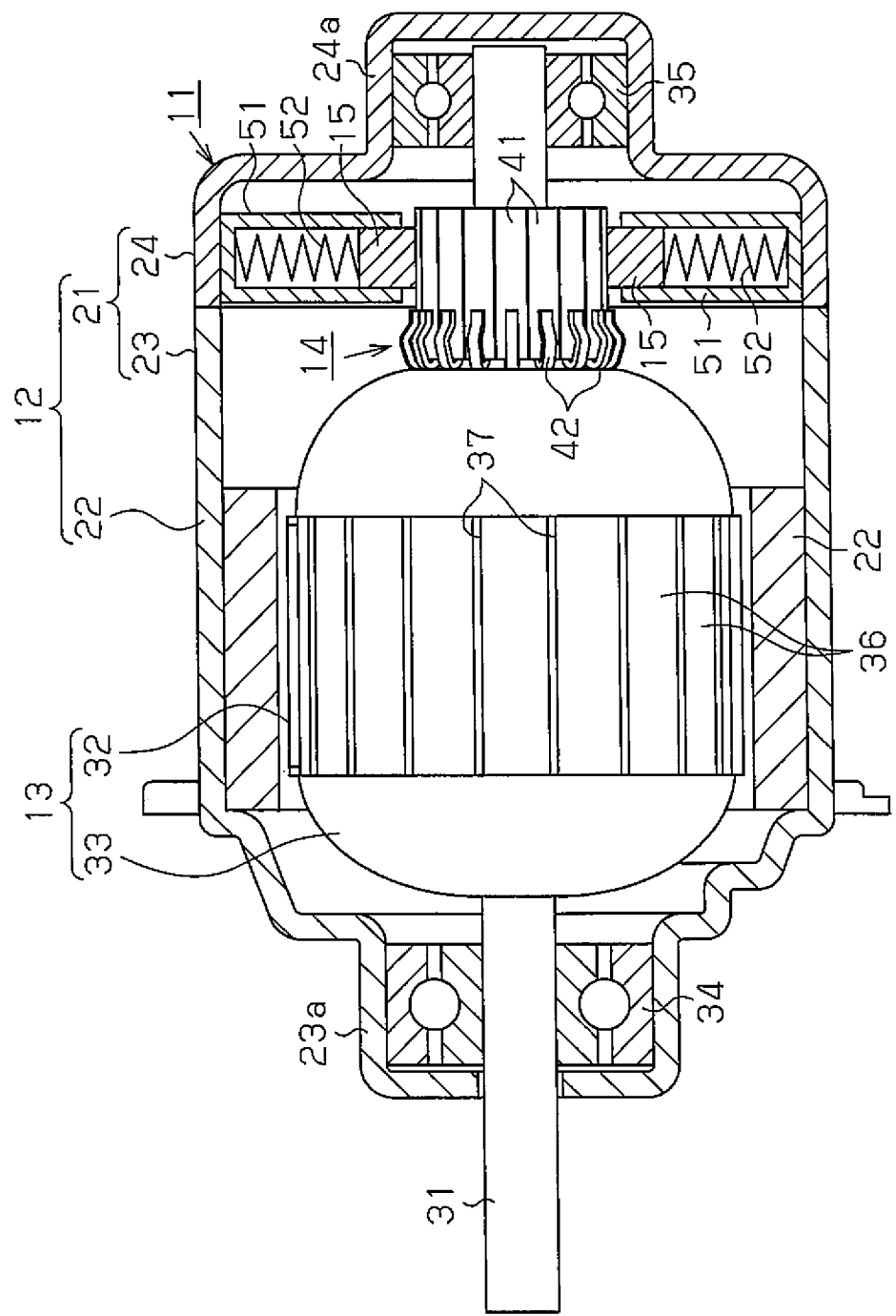
FIG. 1 is a cross-sectional view illustrating a direct-current motor according to a first embodiment of the present invention cut along the axis of the direct-current motor.

As shown in FIG. 1, a direct-current motor 11 includes a tubular stator 12, an armature 13, a commutator 14, and brushes 15. The armature 13 and the commutator 14 are rotationally supported inside the stator 12. The brushes 15 are secured inside the stator 12 and slide against the commutator 14.

<Stator>

The stator 12 includes a cylindrical yoke housing 21, and six permanent magnets 22, which are secured to the inner circumferential surface of the yoke housing 21. The yoke housing 21 includes a tubular front housing member 23, which has a lid on one end, and an end housing member 24, which closes the opening portion of the front housing member 23. The end housing member 24 is a cylinder having one closed end. The permanent magnets 22 are arranged in the circumferential direction of the front housing member 23 at equal angular intervals such that positive poles and negative poles are alternatively arranged.

<Armature>

The armature 13 includes an iron core 32, which is securely fitted to a rotary shaft 31, and an enamel-coated coil 33, which is wound about the iron core 32.

The rotary shaft 31 is rotationally supported with respect to the yoke housing 21 via two bearings 34, 35 provided in a boss 23a on the front housing member 23 and a boss 24a on the end housing member 24. A first end of the rotary shaft 31 extends through the front housing member 23 and protrudes outside of the front housing member 23. A second end of the rotary shaft 31 is located inside the end housing member 24.

The iron core 32 is formed by laminating magnetic steel sheets into columnar shape. The iron core 32 faces the permanent magnets 22 in the radial direction with a space formed in between. Nine T-shaped teeth 36, which extend radially about the rotary shaft 31, are formed on the outer circumferential portion of the iron core 32. The teeth 36 are arranged in the circumferential direction of the iron core 32 at equal angular intervals. Also, the teeth 36 extend along the entire length of the axial direction of the iron core 32. Nine dovetail groove-like slots 37 are formed between the adjacent teeth 36. The coil 33 is wound about each of the teeth 36 by a coil winding procedure, which will be discussed below. The coil 33 includes a reverse coil 33a (FIG. 2A), which is a conductive wire wound in the reverse direction, a forward coil 33b (FIG. 2A) which is a conductive wire wound in the forward direction, and lead portions, which connects the ends of the coils 33a, 33b to a commutator pieces 41, which will be discussed below.

<Commutator>

The commutator 14 is provided on the iron core 32 in the vicinity of the end housing member 24. The commutator 14 is formed by securing eighteen commutator pieces (segments) 41 on the circumferential surface of a non-illustrated cylindrical insulating body. The number of the commutator pieces 41 is set to twice the number of the teeth 36. Each commutator piece 41 is formed by a strip-like metal piece, which extends in the axial direction of the commutator piece 14. The commutator pieces 41 are arranged at equal intervals in the circumferential direction of the insulating body in a state in which the commutator pieces 41 are insulated from each other. A riser 42 is formed integrally with the end of each commutator piece 41 that is located close to the iron core 32. The risers 42 are folded outward. The winding start end and the winding finish end of the coils 33 are hooked around the risers 42. The coils 33 are secured to the risers 42 by fusing. Thus, each commutator piece 41 is electrically connected to the coil 33 corresponding to the commutator piece 41.

<Brushes>

Six brushes 15 are accommodated in six brush holders 51, which are located on the inner circumferential surface of the end housing member 24. Each brush holder 51 is formed of plastic material into a cylinder with one closed end. The brush holders 51 are arranged at equal angular intervals in the circumferential direction of the end housing member 24 to correspond to the permanent magnets 22 in the axial direction of the yoke housing 21.

A compression coil spring 52 is arranged between each brush 15 and the bottom wall of the corresponding brush holder 51. Each brush 15 is constantly urged in a direction to protrude from the corresponding brush holder 51 by elastic force of the compression coil spring 52. The displacement of each brush 15 in the direction to protrude from the corresponding brush holder 51 is restricted by the abutment of the distal end of the brush 15 against the outer circumferential surface of the commutator 14. As the commutator 14 rotates, the distal end of each brush 15 slides against the outer circumferential surface of the commutator 14 (commutator pieces 41). Electric power from an external power source is supplied to the commutator 14 via the brushes 15.

Three of the six brushes 15 are positive pole brushes to which positive potential is applied, and the remaining three brushes 15 are negative pole brushes to which negative potential is applied. The brushes 15 that become the positive poles and the brushes 15 that become the negative poles are arranged at equal intervals in the circumferential direction of the commutator 14.

<Coil Winding Procedure>

A coil winding procedure will now be described with reference to FIG. 2A. FIG. 2A is a developed view showing the armature 13 and the commutator 14. In the drawing, the spaces between adjacent teeth 36, 36 correspond to the slots 37. In the drawing, the commutator pieces 41 are given numbers 1 to 18, and the teeth 36 are given numbers 1 to 9 to distinguish the individual commutator pieces 41 and the individual teeth 36. Further, FIG. 2A shows the state in which the brushes 15 that become the positive poles are respectively located between the commutator pieces 41 of No. 1 and No. 2, between the commutator pieces 41 of No. 7 and No. 8, and between the commutator pieces 41 of No. 13 and No. 14, and contact these commutator pieces 41. The brushes 15 that become the negative poles are respectively located between the commutator pieces 41 of No. 4 and No. 5, between the commutator pieces 41 of No. 10 and No. 11, and commutator pieces 41 of No. 16 and No. 17, and contact these commutator pieces 41. The conductive wires that extend between the teeth 35 and the commutator 14 correspond to the lead portions. The coils 33a, 33b each have a first end and a second end at the boundaries with respect to the corresponding lead portions.

In a case in which the coil 33 is started to be wound from, for example, the commutator piece 41 of No. 2, first, the conductive wire is hooked around the riser 42 of the commutator piece 41 of No. 2 (not shown in FIG. 2A; the same shall apply hereinafter), and thereafter the conductive wire is drawn into the slot 37 between the tooth 36 of No. 3 and the tooth 36 of No. 4. Then, the conductive wire is wound about the tooth 36 of No. 3 by a predetermined number of times in the reverse direction to form the reverse coil 33*a*. Subsequently, the conductive wire is drawn out from the slot 37 between the tooth 36 of No. 2 and the tooth 36 of No. 3, and after being hooked around the riser 42 of the commutator piece 41 of No. 9, the conductive wire is drawn into the slot 37 between the tooth 36 of No. 7 and the tooth 36 of No. 8. Then, the conductive wire is wound about the tooth 36 of No. 8 by a predetermined number of times in the forward direction to form the forward coil 33*b*. Subsequently, the conductive wire is drawn out from the slot 37 between the tooth 36 of No. 8 and the tooth 36 of No. 9, and is hooked around the riser 42 of the commutator piece 41 of No. 4. The aforementioned coil winding procedure of a single conductive wire is referred to as one pattern, and the winding process is continuously repeated in the same pattern thereafter. In the present embodiment, the same winding pattern is repeated by the total of nine times before completing the coil winding process.

By undergoing this coil winding procedure, the reverse coil 33*a* and the forward coil 33*b* of each tooth 36 are electrically connected to the commutator piece 41 of the same phase between the brush 15 that becomes the positive pole and the brush 15 that becomes the negative pole, which are different from each other. For example, in the state of FIG. 2A, the first end of the reverse coil 33*a* of the tooth 36 of No. 3 is electrically connected to the brush 15 that becomes the positive pole between the commutator pieces 41, 41 of Nos. 1 and 2, and the second end of the reverse coil 33*a* is electrically connected to the brush 15 that becomes the negative pole between the commutator pieces 41, 41 of No. 4 and 5 via lead portions. Also, the first end of the forward coil 33*b* of the tooth 36 of No. 3 is electrically connected to the brush 15 that becomes the negative pole between the commutator pieces 41, 41 of Nos. 16 and 17, and the second end of the forward coil 33*b* is electrically connected to the brush 15 that becomes the positive pole between the commutator pieces 41, 41 of Nos. 1 and 2 via the lead portions.

<Operation of Coil>

The operation of the coil wound as described above will now be described.

In the case in which the six brushes 15 are provided as in the present embodiment, the following issues are concerned. That is, while it is ideal to bring the distributed three brushes 15 having the same pole (positive pole or negative pole) into contact with the corresponding commutator pieces 41 in synchronization, the times at which the brushes 15 contact the corresponding commutator pieces 41 might be different from each other due to assembly error of the brushes 15. Then, the times at which power is supplied to the reverse coil 33*a* and the forward coil 33*b* corresponding to the commutator pieces 41, that is, the times at which the reverse coil 33*a* and the forward coil 33*b* are excited or non-excited are not synchronized.

For example, when the reverse coil 33*a* and the forward coil 33*b* provided on each tooth 36 are electrically connected to the commutator pieces 41 between the same brushes 15 having the positive pole and the same brushes 15 having the negative pole, the following circumstance will occur. That is, three pairs of the reverse coils 33*a* and the forward coils 33*b* the phases of which are shifted by 120° from each other are originally brought into an excited state or a non-excited state at the same time. However, a circumstance occurs in which one or two pairs among the three pairs are excited and the remaining two or one pair is not excited. Thus, the times at which torque is generated between the teeth 36 and the permanent magnets 22 do not match, and the torque becomes uneven. This might hinder smooth rotation of the direct-current motor 11, and cause rotational unevenness.

In this point, according to the present embodiment, the reverse coil 33*a* and the forward coil 33*b* of each tooth 36 are electrically connected to the commutator pieces 41 of the same phase between the brushes 15 having the positive and negative poles that are different from each other. That is, in regard to the reverse coil 33*a* and the forward coil 33*b* provided on the same tooth 36, the brush 15 of the positive pole electrically connected to the reverse coil 33*a* and the brush 15 of the positive pole electrically connected to the forward coil 33*b* are the same, but the brush 15 of the negative pole electrically connected to the reverse coil 33*a* and the brush 15 of the negative pole electrically connected to the forward coil 33*b* are different from each other. Thus, even in the case in which the times at which the distributed three brushes 15 having the same pole (positive pole or negative pole) contact the commutator pieces 41 do not synchronize, the probability is increased that at least one of the three pairs of the reverse coil 33*a* and the forward coil 33*b* are simultaneously excited or non-excited. Thus, imbalance of the time at which the torque is generated, or uneven generation of torque, is reduced, and the direct-current motor 11 is allowed to rotate smoothly.

The phrase "the commutator pieces 41 of the same phase" refers to the commutator pieces 41 arranged such that the reverse coil 33*a* and the forward coil 33*b* provided on the same tooth 36 are excited or non-excited at the same time.

Advantages of Present Embodiment

The present embodiment provides the following advantages.

(1) Since six brushes 15 are provided, load current per brush is reduced as compared to the case in which less than six brushes 15 are provided. Since electrical wear is also reduced, life of the brushes 15 is sufficient. Further, equalizers for connecting the commutator pieces 41 that should have the same potential are not provided. Therefore, it is not necessary to ensure spaces for arranging the equalizers. Thus, output of the direct-current motor 11 can be increased.

(2) Furthermore, as described above, the reverse coil 33*a* and the forward coil 33*b* provided on each tooth 36 are electrically connected to the commutator pieces 41 of the same phase between the brushes 15 having the positive and negative poles that are different from each other. Thus, even in the case in which the times at which the distributed three brushes 15 having the same pole (positive pole or negative pole) contact the corresponding commutator pieces 41 do not synchronize, at least one of the three pairs of the reverse coil 33*a* and the forward coil 33*b*, the phases of which are shifted by 120° from each other, are simultaneously excited or non-excited. Therefore, uneven generation of motor torque is reduced, and the direct-current motor is smoothly rotated.

(3) Depending on the application of the direct-current motor 11, external force in the bending direction might be applied to the outer end portion of the rotary shaft 31. In this case, compression stress or tensile stress might occur at the coil lead portions connecting the commutator 14 and the coils 33. In this respect, according to the present embodiment, the ends of the forward coil 33*b* are respectively connected to two commutator pieces 41 the phases of which are shifted by at least 180° in the rotation direction of the commutator 14. Thus, as shown in FIG. 2B, each forward coil 33*b* and the commutator piece 41 to which the associated coil lead portion is connected are located on the opposite sides of the rotary shaft 31. Thus, when the external force in the bending direction is applied to the outer end portion of the rotary shaft 31, tensile stress or compression stress is generated at the first end of the lead portion, and compression stress or tensile stress is generated at the second end. That is, at the lead portion, the tensile stress and the compression stress cancel each other. Thus, damage caused by fatigue of the lead portions of the forward coils 33b is reduced.

Second Embodiment

A second embodiment of the present invention will now be described. The second embodiment differs from the first embodiment in the way the coil is wound, and has basically the same structure as the direct-current motor shown in FIG. 1. Therefore, like or the same reference numerals are given to those components that are like or the same as the corresponding components of the first embodiment and detailed explanations are omitted.

Figure 3:
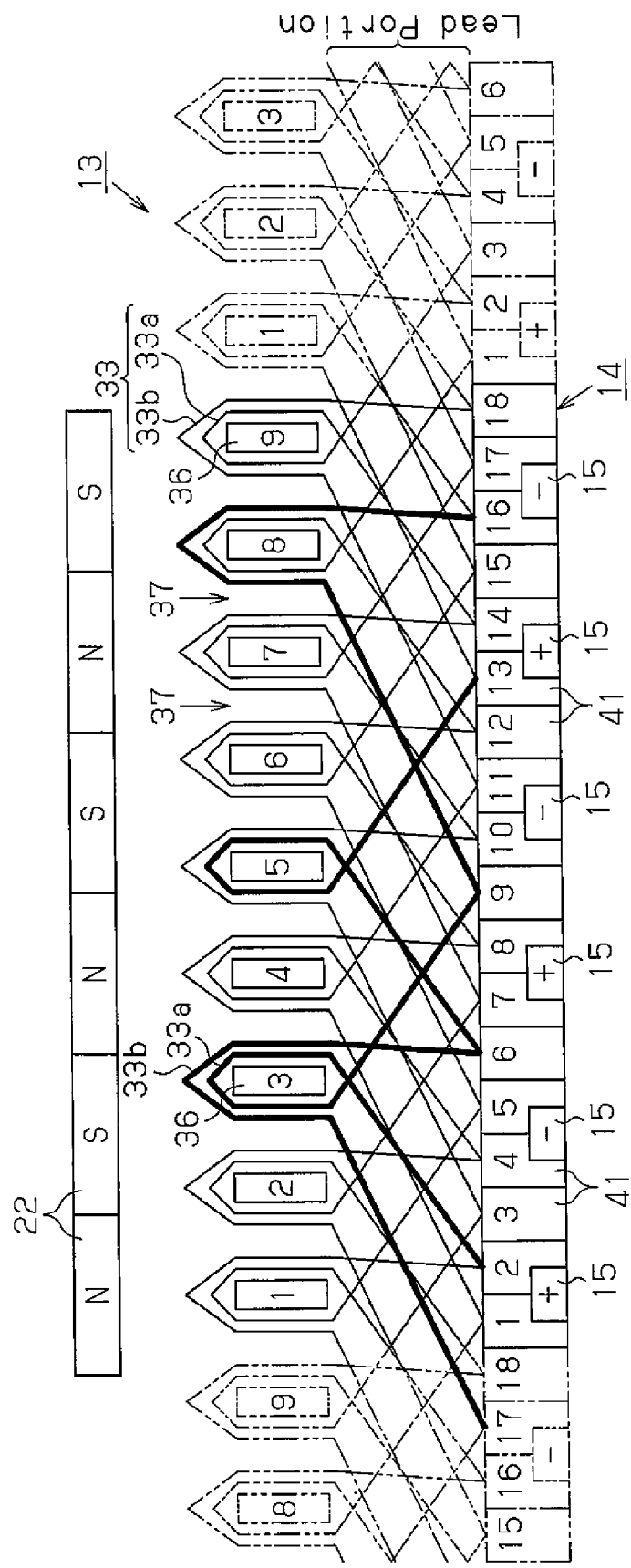
FIG. 3 is a developed view illustrating an armature of a direct-current motor according to a second embodiment of the present invention.

As shown in FIG. 3, in a case in which the coil 33 is started to be wound from, for example, the commutator piece 41 of No. 2, first, the conductive wire is hooked around the riser 42 of the commutator piece 41 of No. 2 (not shown in FIG. 3; the same shall apply hereinafter), and thereafter the conductive wire is drawn into the slot 37 between the tooth 36 of No. 3 and the tooth 36 of No. 4. Then, the conductive wire is wound about the tooth 36 of No. 3 by a predetermined number of times in the reverse direction to form the reverse coil 33a. Subsequently, the conductive wire is drawn out from the slot 37 between the tooth 36 of No. 2 and the tooth 36 of No. 3, and after being hooked around the riser 42 of the commutator piece 41 of No. 9, the conductive wire is drawn into the slot 37 between the tooth 36 of No. 7 and the tooth 36 of No. 8. Then, the conductive wire is wound about the tooth 36 of No. 8 by a predetermined number of times in the forward direction to form the forward coil 33b. Subsequently, the conductive wire is drawn out from the slot 37 between the tooth 36 of No. 8 and the tooth 36 of No. 9, and is hooked around the commutator piece 41 closest to the tooth 36 of No. 8, in this case, the riser 42 of the 16th commutator piece 41. The aforementioned process is referred to as one pattern, and the winding process is continuously repeated in the same pattern thereafter. In the present embodiment, the same winding pattern is repeated by the total of nine times before completing the coil winding process. The winding pattern of the present embodiment is achieved by changing the winding pattern shown in FIG. 2A by shifting the second end of the forward coil 33b (the end connected to the commutator piece 41 of a greater number) in the direction in which the number is decreased by the amount corresponding to six commutator pieces 41. Also, in FIG. 2A, the second end of the reverse coil 33a is connected to the commutator piece 41 of No. 4. However, in FIG. 3, the second end of the reverse coil 33a is connected to the commutator piece 41 of No. 16, which is the sixth commutator piece to the left from the commutator piece 41 of No. 4.

By undergoing this coil winding procedure, the reverse coil 33a and the forward coil 33b of each tooth 36 are electrically connected to the commutator pieces 41 of the same phase between the brush 15 that becomes the positive pole and the brush 15 that becomes the negative pole, which are different from each other. For example, in the state of FIG. 3, the first end of the reverse coil 33a of the tooth 36 of No. 3 is electrically connected to the brush 15 that becomes the positive pole between the commutator pieces 41, 41 of Nos. 1 and 2, and the second end is electrically connected to the brush 15 that becomes the negative pole between the commutator pieces 41, 41 of Nos. 16 and 17. Also, the first end of the forward coil 33b of the tooth 36 of No. 3 is electrically connected to the brush 15 that becomes the negative pole between the commutator pieces 41, 41 of Nos. 16 and 17, and the second end is electrically connected to the brush 15 that becomes the positive pole between the commutator pieces 41, 41 of Nos. 13 and 14. That is, in regard to the reverse coil 33a and the forward coil 33b provided on the same tooth 36, the brush 15 having the positive pole that is electrically connected to the reverse coil 33a and the brush 15 having the positive pole that is electrically connected to the forward coil 33b are different from each other, but the brush 15 having the negative pole that is electrically connected to the reverse coil 33a and the brush 15 having the negative pole that is electrically connected to the forward coil 33b are the same.

The present embodiment has the following advantages in addition to the advantages (1) and (2) of the first embodiment.

(4) The second end of the forward coil 33b is connected to the commutator piece 41 closest to the tooth 36 of No. 3 on which the forward coil 33b is provided. Thus, compared to the case in which the second end of the forward coil 33b is not connected to the closest commutator piece 41, the length of the lead portion of the coil 33 that connects the second end of the forward coil 33b and the associated commutator piece 41 is shortened. The resistance loss of the coil 33 is reduced by the amount corresponding to the length of the lead portion of the coil 33 that is shortened.

Third Embodiment

A third embodiment of the present invention will now be described. The third embodiment differs from the second embodiment in the coil winding pattern.

Figure 4:
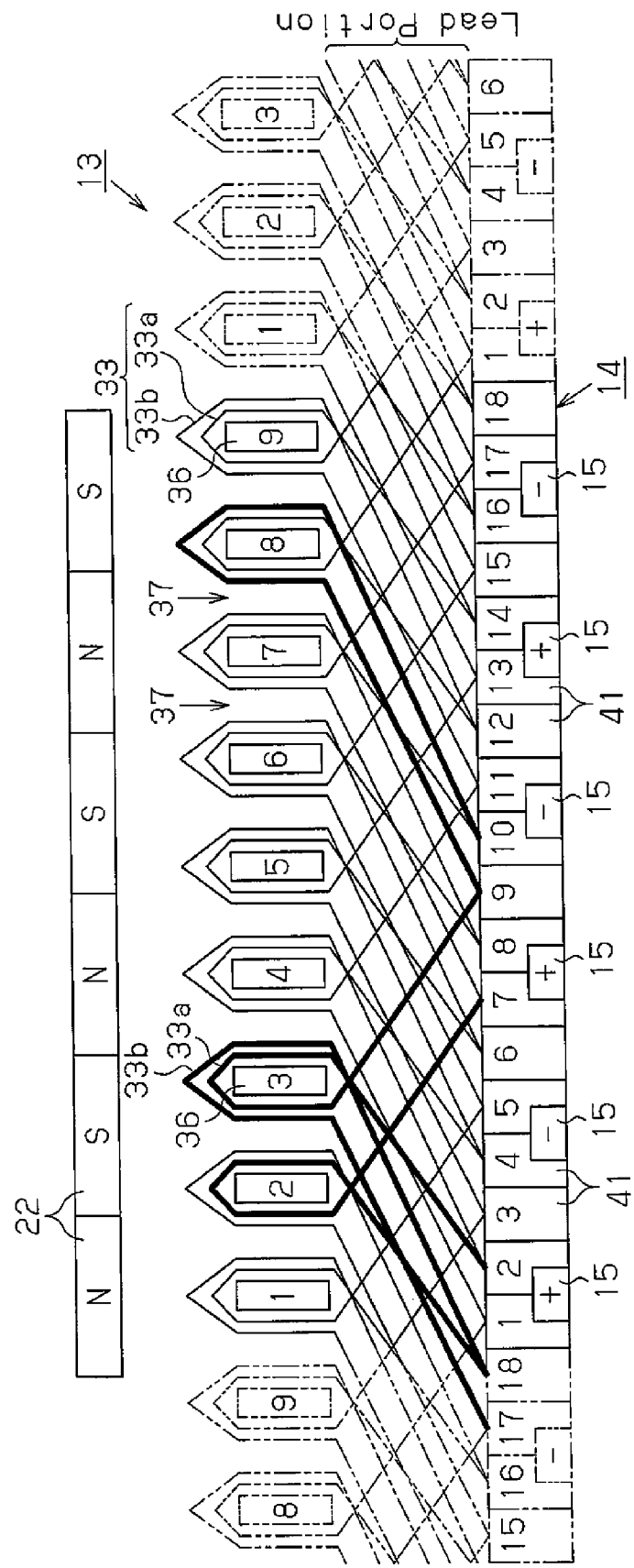
FIG. 4 is a developed view illustrating an armature of a direct-current motor according to a third embodiment of the present invention.

As shown in FIG. 4, in a case in which the coil 33 is started to be wound from, for example, the commutator piece 41 of No. 2, first, the conductive wire is hooked around the riser 42 of the commutator piece 41 of No. 2 (not shown in FIG. 4; the same shall apply hereinafter), and thereafter the conductive wire is drawn into the slot 37 between the tooth 36 of No. 3 and the tooth 36 of No. 4. Then, the conductive wire is wound about the tooth 36 of No. 3 by a predetermined number of times in the reverse direction to form the reverse coil 33a. Subsequently, the conductive wire is drawn out from the slot 37 between the tooth 36 of No. 2 and the tooth 36 of No. 3, and after being hooked around the riser 42 of the commutator piece 41 of No. 9, the conductive wire is drawn into the slot 37 between the tooth 36 of No. 7 and the tooth 36 of No. 8. Then, the conductive wire is wound about the tooth 36 of No. 8 by a predetermined number of times in the forward direction to form the forward coil 33b. Subsequently, the conductive wire is drawn out from the slot 37 between the tooth 36 of No. 8 and the tooth 36 of No. 9, and is hooked around the riser 42 of the commutator piece 41 of No. 10. The aforementioned process is referred to as one pattern, and the winding process is continuously repeated in the same pattern thereafter. In the present embodiment also, the same winding pattern is repeated by the total of nine times before completing the coil winding process. The coil pattern of the present embodiment is achieved by changing the coil pattern shown in FIG. 2A by shifting the second end of the forward coil 33b (the end connected to the commutator pieces 41 of a greater number) in the direction in which the number is decreased by the amount corresponding to twelve commutator pieces 41. Also, in FIG. 2A, the second end of the reverse coil 33a is connected to the commutator piece 41 of No. 4. However, in FIG. 4, the second end of the reverse coil 33a is connected to the commutator piece 41 of No. 10, which is the twelfth commutator piece to the left from the commutator piece 41 of No. 4.

By undergoing this coil winding procedure, the reverse coil 33a and the forward coil 33b of each tooth 36 are electrically connected to the commutator pieces 41 of the same phase between the brush 15 that becomes the positive pole and the brush 15 that becomes the negative pole, which are different from each other. For example, in the state of FIG. 4, the first end of the reverse coil 33a of the tooth 36 of No. 3 is electrically connected to the brush 15 that becomes the positive pole between the commutator pieces 41, 41 of Nos. 1 and 2, and the second end is electrically connected to the brush 15 that becomes the negative pole between the commutator pieces 41, 41 of Nos. 10 and 11. Also, the first end of the forward coil 33b of the tooth 36 of No. 3 is electrically connected to the brush 15 that becomes the negative pole between the commutator pieces 41, 41 of Nos. 16 and 17, and the second end is electrically connected to the brush 15 that becomes the positive pole between the commutator pieces 41, 41 of Nos. 7 and 8. That is, in regard to the reverse coil 33a and the forward coil 33b provided on the same tooth 36, the brush 15 having the positive pole that is electrically connected to the reverse coil 33a differs from the brush 15 having the positive pole that is electrically connected to the forward coil 33b, and the brush 15 having the negative pole that is electrically connected to the reverse coil 33a differs from the brush 15 having the negative pole that is electrically connected to the forward coil 33b.

The third embodiment has the following advantages in addition to the advantages (1) and (2) of the first embodiment.

(5) The lead portions of the coil 33, which connect the first end and the second end of the forward coil 33b to the commutator pieces 41, extend in the same direction without intersecting each other. Thus, the lead portions located on both ends of the forward coil 33b do not overlap each other.

Fourth Embodiment

A fourth embodiment of the present invention will now be described. The fourth embodiment differs from the first embodiment in the coil winding pattern.

Figure 5:
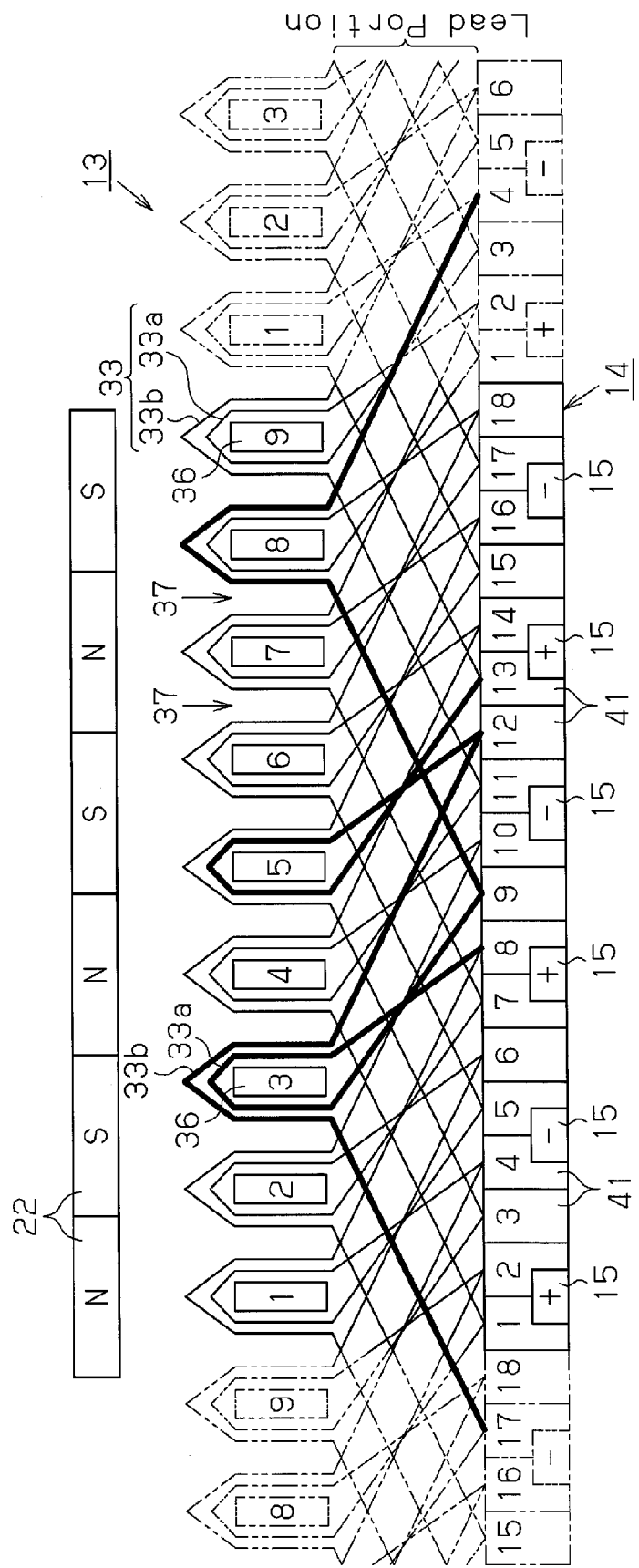
FIG. 5 is a developed view illustrating an armature of a direct-current motor according to a fourth embodiment of the present invention.

As shown in FIG. 5, in a case in which the coil 33 is started to be wound from, for example, the commutator piece 41 of No. 8, first, the conductive wire is hooked around the riser 42 of the commutator piece 41 of No. 8 (not shown in FIG. 3; the same shall apply hereinafter), and thereafter the conductive wire is drawn into the slot 37 between the tooth 36 of No. 3 and the tooth 36 of No. 4. Then, the conductive wire is wound about the tooth 36 of No. 3 by a predetermined number of times in the reverse direction to form the reverse coil 33a. Subsequently, the conductive wire is drawn out from the slot 37 between the tooth 36 of No. 2 and the tooth 36 of No. 3, and after being hooked around the riser 42 of the commutator piece 41 of No. 9, the conductive wire is drawn into the slot 37 between the tooth 36 of No. 7 and the tooth 36 of No. 8. Then, the conductive wire is wound about the tooth 36 of No. 8 by a predetermined number of times in the forward direction to form the forward coil 33b. Subsequently, the conductive wire is drawn out from the slot 37 between the tooth 36 of No. 8 and the tooth 36 of No. 9, and is hooked around the riser 42 of the commutator piece 41 of No. 4. The aforementioned process is referred to as one pattern, and the winding process is continuously repeated in the same pattern thereafter. In the present embodiment also, the same winding pattern is repeated by the total of nine times before completing the coil winding process. The winding pattern of the present embodiment is achieved by changing the coil pattern shown in FIG. 2A by shifting the first end of the reverse coil 33a (the end connected to the commutator piece 41 of the smaller number) in the direction in which the number is increased by the amount corresponding to six commutator pieces 41. Also, in FIG. 2A, the first end of the reverse coil 33a is connected to the commutator piece 41 of No. 2. However, in FIG. 5, the first end of the reverse coil 33a is connected to the commutator piece 41 of No. 8, which is the sixth commutator piece to the right of the commutator piece 41 of No. 2.

By undergoing this coil winding procedure, the reverse coil 33a and the forward coil 33b of each tooth 36 are electrically connected to the commutator pieces 41 of the same phase between the brush 15 that becomes the positive pole and the brush 15 that becomes the negative pole, which are different from each other. For example, in the state of FIG. 5, the first end of the reverse coil 33a of the tooth 36 of No. 3 is electrically connected to the brush 15 that becomes the positive pole between the commutator pieces 41, 41 of Nos. 7 and 8, and the second end is electrically connected to the brush 15 that becomes the negative pole between the commutator pieces 41, 41 of Nos. 4 and 5. Also, the first end of the forward coil 33b of the tooth 36 of No. 3 is electrically connected to the brush 15 that becomes the negative pole between the commutator pieces 41, 41 of Nos. 16 and 17, and the second end is electrically connected to the brush 15 that becomes the positive pole between the commutator pieces 41, 41 of Nos. 13 and 14. That is, in regard to the reverse coil 33a and the forward coil 33b provided on the same tooth 36, the brush 15 having the positive pole that is electrically connected to the reverse coil 33a differs from the brush 15 having the positive pole that is electrically connected to the forward coil 33b, and the brush 15 having the negative pole that is electrically connected to the reverse coil 33a differs from the brush 15 having the negative pole that is electrically connected to the forward coil 33b.

The present embodiment provides the following advantage in addition to the advantages (1) to (3) of the first embodiment.

(6) The second end of the reverse coil 33a is connected to the commutator piece 41 that is closer to itself as compared to the first embodiment. Thus, the length of the lead portion of the coil 33 that connects the second end of the reverse coil 33a to the commutator piece 41 is shortened. The resistance loss of the coil 33 is reduced by the amount corresponding to the length of the lead portion of the coil 33 that is shortened.

<Application of Direct-Current Motor>

The direct-current motor of the illustrated embodiments may be employed in various applications. For example, the direct-current motor may be used as an ABS motor, which serves as a driving source for an anti-lock brake system (ABS) of an automobile. The ABS is a system for preventing tires from locking by intermittently reducing the brake pressure. The ABS motor activates a hydraulic pump that returns brake liquid discharged for decompression into the original hydraulic cylinder.

The invention claimed is:
1. A direct-current motor, comprising:
a cylindrical yoke having six magnetic poles;
an iron core rotationally provided inside the yoke, the iron core having nine teeth arranged in a rotation direction;
a first coil wound about each tooth in a forward direction;
a second coil wound about each tooth in a reverse direction with respect to the first coil;
a commutator for being rotated integrally with the iron core, the commutator having eighteen commutator pieces arranged in the rotation direction; and three sets of brushes retained inside the yoke, each set having a pair of brushes, wherein each set of the brushes supplies electricity to the first and second coils by sliding against corresponding commutator pieces, wherein the first and second coils provided on a same tooth are connected to the commutator pieces of a same phase such that the first and second coils are electrically connected to an arbitrary one of the brushes having a positive pole and an arbitrary one of the brushes having a negative pole simultaneously, wherein, the first coil has ends respectively connected to two commutator pieces, the second coil has ends respectively connected to two commutator pieces, the same tooth on which the first and second coils are provided corresponds to a circumferential midpoint between the ends of the first coil, the same tooth on which the first and second coils are provided corresponds to a circumferential midpoint between the ends of the second coil, and the brush having the positive pole electrically connected to the first coil is different from the brush having the positive pole electrically connected to the second coil, or the brush having the negative pole electrically connected to the first coil is different from the brush having the negative pole electrically connected to the second coil, or the brush having the positive pole and the brush having the negative pole that are electrically connected to the first coil are respectively different from the brush having the positive pole and the brush having the negative pole that are electrically connected to the second coil.

2. The direct-current motor according to claim 1, wherein the ends of the first coil are respectively connected to two commutator pieces the phases of which are shifted by at least 180° in a rotation direction of the commutator.

3. The direct-current motor according to claim 1, wherein another second coil is provided on a tooth that is different from the same tooth in which the first coil is provided, said other second coil is connected to one of the commutator pieces to which the first coil is connected, and the first coil and said other second coil are configured by a single conducive wire.

4. The direct-current motor according to claim 1, wherein the ends of the first coil are symmetrically arranged with respect to the same tooth, and the ends of the second coil are symmetrically arranged with respect to the same tooth.

5. A coil winding method for a direct-current motor, wherein the direct-current motor includes:

a cylindrical yoke having six magnetic poles;

an iron core rotationally provided inside the yoke, the iron core having nine teeth arranged in a rotation direction;

a first coil wound about each tooth in a forward direction;

a second coil wound about each tooth in a reverse direction with respect to the first coil;

a commutator for being rotated integrally with the iron core, the commutator having eighteen commutator pieces arranged in the rotation direction; and three sets of brushes retained in the yoke, each set having a pair of brushes, wherein each set of the brushes supplies electricity to the first and second coils by sliding against corresponding commutator pieces, the method comprising:

continuously winding each of the first and second coils such that the first and second coils provided on a same tooth are connected to the commutator pieces of a same phase such that the first and second coils are electrically connected to an arbitrary one of the brushes having a positive pole and an arbitrary one of the brushes having a negative pole simultaneously, and such that:

the brush having the positive pole electrically connected to the first coil is different from the brush having the positive pole electrically connected to the second coil, or the brush having the negative pole electrically connected to the first coil is different from the brush having the negative pole electrically connected to the second coil, or the brush having the positive pole and the brush having the negative pole that are electrically connected to the first coil are respectively different from the brush having the positive pole and the brush having the negative pole that are electrically connected to the second coil, wherein, the first coil has ends respectively connected to two commutator pieces, the second coil has ends respectively connected to two commutator pieces, the same tooth on which the first and second coils are provided corresponds to a circumferential midpoint between the ends of the first coil, and the same tooth on which the first and second coils are provided corresponds to a circumferential midpoint between the ends of the second coil.

6. A method for manufacturing a direct-current motor, comprising:

providing a cylindrical yoke having six magnetic poles;

providing an iron core rotationally provided inside the yoke, the iron core having nine teeth arranged in a rotation direction;

providing a first coil wound about each tooth in a forward direction;

providing a second coil wound about each tooth in a reverse direction with respect to the first coil;

providing a commutator for being rotated integrally with the iron core, the commutator having eighteen commutator pieces arranged in the rotation direction; and providing three sets of brushes retained inside the yoke, each set having a pair of brushes, wherein each set of the brushes supplies electricity to the first and second coils by sliding against corresponding commutator pieces, wherein the first and second coils provided on a same tooth are connected to the commutator pieces of a same phase such that the first and second coils are electrically connected to an arbitrary one of the brushes having a positive pole and an arbitrary one of the brushes having a negative pole simultaneously, wherein, the brush having the positive pole electrically connected to the first coil is different from the brush having the positive pole electrically connected to the second coil, or the brush having the negative pole electrically connected to the first coil is different from the brush having the negative pole electrically connected to the second coil, or the brush having the positive pole and the brush having the negative pole that are electrically connected to the first coil are respectively different from the brush having the positive pole and the brush having the negative pole that are electrically connected to the second coil, and wherein,
   the first coil has ends respectively connected to two commutator pieces,
   the second coil has ends respectively connected to two commutator pieces,
   the same tooth on which the first and second coils are provided corresponds to a circumferential midpoint between the ends of the first coil, and
   the same tooth on which the first and second coils are provided corresponds to a circumferential midpoint between the ends of the second coil.

* * * * *